Jan. 15, 1963   D. R. BOYD ETAL   3,073,011
PROCESS OF APPLYING OHMIC CONTACTS TO CRYSTALS
Filed March 31, 1958

INVENTORS
David R. Boyd &
Yrö T. Sihvonen
BY
R. C. Fowler
ATTORNEY

Patented Jan. 15, 1963

3,073,011
PROCESS OF APPLYING OHMIC CONTACTS TO CRYSTALS
David R. Boyd, Royal Oak, and Yro T. Sihvonen, Birmingham, Mich., assignors to General Motors Corporation, Detroit, Mich., a corporation of Delaware
Filed Mar. 31, 1958, Ser. No. 725,036
5 Claims. (Cl. 29—155.5)

This invention relates to a method of applying ohmic contacts to semiconductor crystals.

One of the problems encountered in the fabrication of semiconductor crystals is a means to obtain a purely ohmic contact thereto by which the crystal may be connected into an electrical circuit. For example, it has been difficult to obtain a pure ohmic contact to a cadmium sulfide crystal and it has further been felt that many metals for such contact were not useable in forming a pure ohmic connection to such crystals. The resistivity of cadmium sulfide crystals varies with the amount of electromagnetic and nuclear radiation applied thereto and they are thus useful as sensing cells for control purposes. In such cells, it is desirable that the crystal assembly have a substantially straight line voltage-current graph in order to be more useful in measuring devices where distortion might give an erroneous result, and also to give the greatest sensitivity. It has been the considered opinion of many that there were only a few metals for use as a contact which would give a satisfactory ohmic contact to a cadmium sulfide crystal. However, by using our method of assembly and treatment, we have been able to obtain ohmic contact of satisfactory character between a very large number of metal probes or electrodes and cadmium sulfide crystals.

It is therefore an object in making this invention to provide a method of assembling a conductive probe or electrode and a semiconductor crystal so that the contact between the two is substantially ohmic.

It is a further object in making this invention to provide a method of fabricating a cadmium sulfide crystal with a substantially pure ohmic contact for various control purposes.

With these and other objects in view which will become apparent as the specification proceeds, the invention will be best understood by reference to the following specification and claims and the illustration in the accompanying drawings in which:

In general, our method recognizes the fact that when the end of a metallic probe is brought into contact with a crystal surface such as cadmium sulfide, that a diodic contact is formed between the two materials rather than an ohmic contact. This is probably due to the existence of an exhaustion barrier on the surface of the crystal. If the exhaustion barrier can be destroyed or reduced, then the electrons may tunnel into the semiconductor more freely and an ohmic contact will result. We have found that by applying a relatively high energy pulse to a circuit including the probe and the crystal that this permanently breaks down the barrier and produces a substantially pure ohmic contact between the probe or electrode and the crystal.

Figure 1:
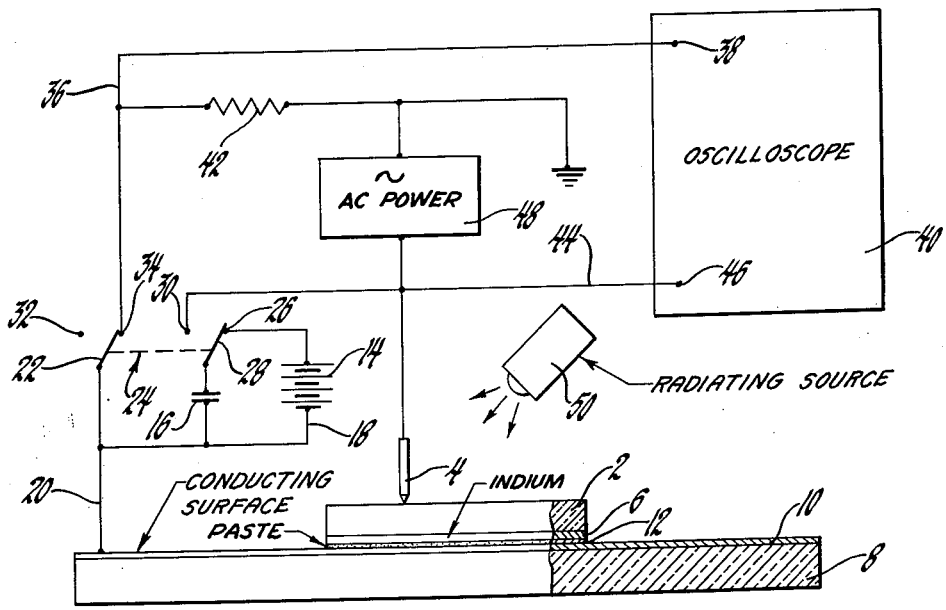
FIGURE 1 is a circuit diagram disclosing the equipment utilized to produce a method of assembly of a probe and crystal.

FIGURE 1 discloses a circuit by which said pulse can be applied to the crystal assemblies and sequentially the crystal assembly can be rechecked to determine the I-V curve.

Referring, therefore, more specifically to FIGURE 1, there is shown therein a cadmium sulfide crystal 2 and a contact or probe 4 supported with its point contacting the surface of the cadmium sulfide crystal by any suitable means. The actual mechanical supporting means has not been shown but it might be any suitable means for holding the two in juxtaposition for later use as an assembly. The crystal has one surface coated with a conductive layer 6 such, for example, as indium, although other metals are equally satisfactory. This assembly is placed on a glass supporting plate 8 which has its upper face coated with a conducting surface 10, permanently attached thereto. In order to satisfactorily couple the indium surface on the back of the crystal 2 with the conductive surface, a layer of conductive paste 12 is sprayed over the area of the junction to allow the current to flow through.

A source of power 14 indicated in this instance as a battery but which may be any other form of D.C. electrical generator, is connected in circuit with a condenser 16 so that it may charge the condenser and place the latter in a charged condition so that it may discharge through the circuit including the probe 4 and crystal 2. The battery 14 therefore has its negative terminal connected through line 18 to one side of the condenser 16 and also to tieline 20 extending from the conducting surface 10 to one movable switch arm 22 of a ganged switch 24. The positive terminal of the battery 14 is connected to stationary contact 26 which is engageable by a second movable switch arm 28 connected to the remaining terminal of the condenser 16. Switch arm 28 moves between two fixed contacts 26 and 30 and is mechanically ganged to, although electrically insulated from, switch arm 22. Switch arm 22 moves between two stationary contacts 32 and 34. Contact 32 is unconnected but contact 34 is connected through line 36 with the Y axis terminal 38 of an oscilloscope 40. Line 36 is likewise connected through a loading resistance 42 to ground. Contact 30 of the switch 24 is connected through line 44 to the X axis terminal 46 of the oscilloscope and also to the probe or contact 4. A source of alternating current power 48 is connected between line 44 and ground in order to apply an alternating current through the contact and simultaneously a sweep to the oscilloscope.

With the crystal located on the glass backing plate as shown, and with the switch 24 in the position shown, the condenser 16 will be charged by the power source 14. When the switch 24 is thrown to the opposite position, the condenser 16 is connected directly across the probe and crystal contact and discharges through this short circuit. This high energy pulse breaks down the barrier existing at the surface and provides a substantially uniform ohmic contact with the surface of the crystal. The current pulse necessary to change the rectifying or diodic contact must be of sufficient strength as a small pulse may be insufficient. Neither can the pulse be too large as it might cause a breakdown of the crystal structure at the contact point. During the performance of this method, it is necessary to direct a certain amount of radiation on the surface of the crystal, both in order to increase the electrical conductivity of the crystal and to afterwards test the crystal to see if the desired result has been obtained. There is therefore shown a source of radiation 50 as directing rays on the crystal adjacent the area of the contact.

We have further estimated that the application of the pulse must be such as to make the probe positive and the crystal the negative terminals of the electrical circuit. If the pulse amplitude is too small, no permanent modification of the contact will be made. As the pulse grows larger, a slight contact modification was evidenced and as the pulses were repeated, the effect can be additive until linearity of the I-V curve is obtained. However, as the larger pulses are applied, which approach the avalanche breakdown of crystals, a single pulse may be effective to produce linearity. If the same method is applied, but the negative polarity applied to the probe, no modification is obtained. As an example of a satisfactory value of condenser which can be used, we have satisfactorily used a 1/10 microfarad condenser and a charging voltage of some 300 volts. If less voltage is used, repetitive application of pulses may produce the desired linearity of the I-V curve.

Figure 2A:
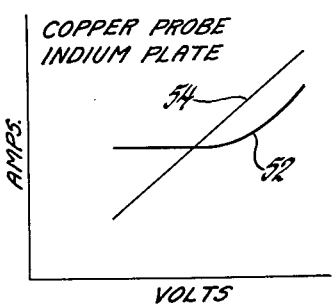
FIGURES 2a and 2b are diagrammatic showings of the traces on the head of a cathode ray oscilloscope illustrating the change in the I-V curves utilizing different metallic materials.
Figure 2B:
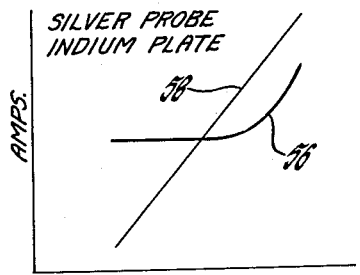

To illustrate the changes produced by this method, reference should be made to FIGURES 2a and 2b in which the actual results of a test run are given. FIGURE 2a shows the traces on the head of the oscilloscope tube when the probe 4 is made of copper and the backing plate 6 is of indium. In that case, the trace 52 shows the I-V curve upon the mere mechanical application of the probe to the cadmium sulfide crystal initially as the voltage is periodically varied. From the non-linearity of the curve 52, it can be readily seen that this non-linearity might inject serious difficulties in measuring instruments if the crystal assembly was used as a light or other radiation sensitive device. After the application of a sufficiently large or a sufficient number of smaller pulses, curve 54 was produced on the head of the oscilloscope which clearly indicates the transition to a straight line relationship between the two.

FIGURE 2b is a similar showing of actual curves obtained when the probe is silver and the backing plate still of indium. In this case, curve 56 shows the curve obtained prior to the application of any pulses to break down the barrier and trace 58 indicates the linear relationship following the application of such pulses. While originally, only a very small number of metals were deemed satisfactory to use for contacts to CdS crystals, we now find that by using our method the field is enlarged to many different metals for such contacts. For example, we have found that the following metals are satisfactorily useable with cadmium sulfide crystals: copper, gold, silver, bismuth, platinum, indium, aluminum, tantalum, beryllium copper and Phosphor bronze. This list should not be taken in any way as being limiting, as other metals may also be satisfactory.

After the application of one or more pulses to each of these assemblies of contacts and crystals without exception a straight line relation was obtained on the I-V curve indicating an ohmic contact.

Figure 3:
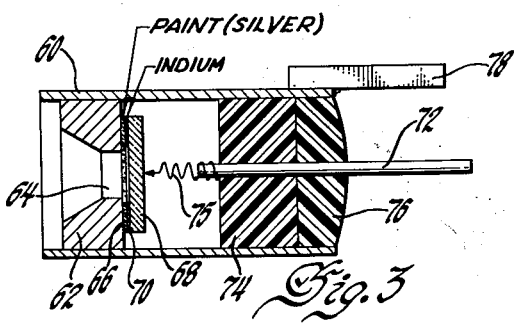
FIGURE 3 is a vertical sectional view through a production crystal unit.

FIGURE 3 shows what might be a production form of crystal mounting assembly. A hollow cylinder 60 of conductive metal such for example as brass, acts as a housing. A brass plug 62 having a central aperture 64 has its rear face coated with conductive paint 66 such as silver, around the aperture. A crystal 68 which may be square or have any other desired outline has an indium coating 70 on one face except in the center in alignment with aperture 64. The crystal is assembled on the rear face of the plug 62 with the indium surface 70 adhered to the silver paint 66 and the plug pressed into the cylinder 60 to a position as shown in FIGURE 3. A rod electrode 72 supported on a plastic disc 74 is pressed in the opposite end of the cylinder until a fine spring wire electrode 75 is forced against the back of the crystal to make contact. Additional insulating material 76 is potted in the end of the cylinder to fix the disc 74 in place. One electrode 78 is connected to the outer shell. This provides a complete assembly of the crystal and terminal or electrode with an aperture through which the radiation may enter. Once assembled, it is ready for connection through electrodes 72—78 into the circuit of FIGURE 1 so that the contact between spring 75 and crystal 68 is converted to an ohmic contact.

We claim:

1. In a method of fabricating radiation sensitive crystal assemblies, the steps of obtaining a body of crystalline structure which is sensitive to radiation within desired wave bands, mechanically supporting a metallic electrode in contact with a surface of the crystalline structure, connecting said electrode and crystalline structure in series electrical cricuit with a source of D.C. voltage with the electrode connected to the positive side of the circuit and the crystalline structure the negative side to apply a substantial voltage pulse having sufficient amplitude to break down any diodic surface barrier on the crystalline structure that may be present between the electrode and crystalline structure but insufficient to destroy the crystalline structure adjacent the junction of the electrode and the crystalline structure to provide a pure ohimc connection between the two.

2. In a method of fabricating a radiation sensitive device, the steps of obtaining a CdS crystal, mechanically supporting a metal electrode in contact with an area of the crystal to which it is desired to make ohmic contact, applying a voltage pulse of approximately 300 volts of short duration to the CdS crystal and metal electrode in such manner that the metal electrode will be at a more positive potential than the CdS crystal to cause a discharge across the junction of the two having sufficient enrgy to break down any diodic barrier that may exist at that point but insufficient energy to destroy the crystalline structure and provide an ohmic connection between the two for a linear current-voltage relation.

3. In a method of fabricating a radiation sensitive device, obtaining a crystal sensitive to radiation within a desired wave band, coating one side of the crystal with a metallic conducting surface, mechanically supporting an electrode in contact with the crystal which it is desired to connect to said crystal at a desired physical point by ohmic connection but which develops a diodic barrier connection upon application, charging an electrical condenser of substantial capacity and connecting said charged condenser across the crystal conducting surface and the electrode to discharge the same in such a manner that the electrode will be at a more positive potential than the crystal prior to discharge, said flow of current having sufficient amplitude to break down the diodic barrier but insufficient to destroy the crystalline structure at this physical point to create an ohmic contact and provide a linear current-voltage relation.

4. In a method of fabricating a radiation sensitive device, the steps of obtaining a CdS crystal, plating one side of the crystal with a conductive material such as indium, placing said plated surface on a large electrically conductive surface, mechanically supporting an electrically conductive probe in contact with another surface of the crystal at a desired junction point, said probe being of metal, and forming with said crystal at diodic contact when initially brought into engagement, subjecting said crystal to radiation from a source and simultaneously applying a substantial voltage pulse to the probe and large conductive surface with the probe at a more positive potential than the large conductive surface, said voltage pulse having sufficient amplitude to break down the diodic barrier but insufficient to destroy the crystalline structure at the junction point of the probe and crystal surface to form an ohmic junction.

5. In a method of fabricating a radiation sensitive device, the steps of obtaining a CdS crystal, mechanically supporting a metal electrode with its end in contact with an area of the crystal at which it is desired to make ohmic contact, applying a plurality of voltage pulses in sequence of short duration and of less than 300 volts to the CdS crystal and metal electrode in such manner that the metal electrode will be at a more positive potential than the CdS crystal to cause a discharge across the junction of the two to gradually break down any diodic barrier that may exist at that point, said voltage having insufficient amplitude to destroy any crystalline structure and provide an ohmic connection for a linear-current voltage relation.

References Cited in the file of this patent

UNITED STATES PATENTS

| | | |
|---|---|---|
| 2,686,279 | Barton | Aug. 10, 1954 |
| 2,736,848 | Rose | Feb. 28, 1956 |
| 2,874,341 | Biondi et al. | Feb. 17, 1959 |
| 2,876,184 | Geppert | Mar. 3, 1959 |